(12) United States Patent
Katsuya

(10) Patent No.: US 12,489,318 B2
(45) Date of Patent: Dec. 2, 2025

(54) NON-CONTACT POWER TRANSMISSION SYSTEM

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/739,358

(22) Filed: Jun. 11, 2024

(65) Prior Publication Data

US 2024/0429747 A1    Dec. 26, 2024

(30) Foreign Application Priority Data

Jun. 26, 2023   (JP) ................. 2023-104439

(51) Int. Cl.
  *H02J 50/12*   (2016.01)
(52) U.S. Cl.
  CPC .................. *H02J 50/12* (2016.02)
(58) Field of Classification Search
  None
  See application file for complete search history.

(56) References Cited

U.S. PATENT DOCUMENTS

| 10,320,234 | B2* | 6/2019 | Aioanei | H02J 50/60 |
| 11,757,307 | B2* | 9/2023 | Peralta | H02J 50/12 |
| | | | | 307/104 |
| 12,176,724 | B2* | 12/2024 | Katsuya | H02M 1/4233 |
| 12,230,977 | B2* | 2/2025 | Nakao | H02M 1/0054 |
| 2018/0219524 | A1* | 8/2018 | Govindaraj | H03H 7/38 |
| 2022/0131413 | A1* | 4/2022 | Yoshida | H02J 50/12 |

FOREIGN PATENT DOCUMENTS

| JP | 2013-201867 | 10/2013 |
| JP | 2019-022444 | 2/2019 |

OTHER PUBLICATIONS

Japanese Office Action for Japanese Patent Application No. 2023-104439 mailed Jan. 7, 2025.

* cited by examiner

*Primary Examiner* — Thomas J. Hiltunen
(74) *Attorney, Agent, or Firm* — Amin, Turocy & Watson, LLP

(57) ABSTRACT

A non-contact power transmission system includes a power reception unit, a received power conversion unit, a current sensor, and a control device. The power reception unit includes a secondary side coil for receiving AC power transmitted in a non-contact manner from a primary side coil of a power transmission device. The received power conversion unit converts AC power received by the power reception unit into DC power. The current sensor detects a current output from the received power conversion unit. The control device acquires a mutual inductance between the primary side coil and the secondary side coil on the basis of a detection value of the current output from the current sensor and controls the received power conversion unit in accordance with the mutual inductance.

2 Claims, 4 Drawing Sheets

NON-CONTACT POWER TRANSMISSION SYSTEM

CROSS-REFERENCE TO RELATED APPLICATION

Priority is claimed on Japanese Patent Application No. 2023-104439, filed Jun. 26, 2023, the content of which is incorporated herein by reference.

BACKGROUND OF THE INVENTION

Field of the Invention

The present invention relates to a non-contact power transmission system.

Description of Related Art

In recent years, in order to be able to ensure access to affordable, reliable, sustainable, and modern energy for more people, research and development related to charging and power supply with respect to vehicles equipped with a secondary battery contributing to energy efficiency has been carried out.

In the related art, regarding non-contact power transmission systems supplying power to a vehicle from outside the vehicle through non-contact power transmission, a system in which a coupling coefficient and transmission efficiency are adjusted by mechanically changing a relative positional relationship between a power transmission side inductor and a power reception side inductor, or the like is known (for example, refer to the following Patent Document 1).

[Patent Document 1] Japanese Unexamined Patent Application, First Publication No. 2013-201867

SUMMARY OF THE INVENTION

Regarding technologies related to charging and supplying power to vehicles equipped with a secondary battery, when non-contact power transmission is performed with respect to a vehicle, it is desired to perform appropriate power control and abnormality detection. However, for example, the ground clearance of a power reception side coil may change depending on the kind (vehicle size or the like) of vehicle equipped with a power reception side unit, replacement or modification of tires and suspensions of each vehicle, change in loading capacity, and the like. As an interval (gap) between a power transmission side coil and a power reception side coil changes, there is concern that suppliable power may change and abnormality detection may become difficult.

An aspect according to the present invention has been made in consideration of such circumstances, and an object thereof is to provide a non-contact power transmission system capable of performing appropriate power control and abnormality detection. Further, this ultimately contributes to energy efficiency.

In order to resolve the foregoing problems and achieve the objects, the present invention employs the following aspects.
  (1) A non-contact power transmission system according to an aspect of the present invention includes a power reception unit that has a power reception side coil receiving AC power transmitted from a power transmission side coil of a power transmission device in a non-contact manner, a power conversion unit that converts the AC power received by the power reception unit into DC power, a current sensor that detects a current output from the power conversion unit, and a control device that acquires a mutual inductance between the power transmission side coil and the power reception side coil on the basis of a detection value of the current output from the current sensor and controls the power conversion unit in accordance with the mutual inductance.
  (2) According to the foregoing aspect (1), the control device may acquire the mutual inductance on the basis of the detection value of the current output from the current sensor in a state in which an output of the power conversion unit is not restricted.
  (3) According to the foregoing aspect (2), the control device may restrict an output of the power conversion unit when the mutual inductance is smaller than a predetermined threshold.
  (4) According to the foregoing aspect (3), the control device may restrict an output of the power conversion unit through a short circuit operation of short-circuiting the power reception side coil.

According to the foregoing aspect (1), since the control device controlling the power conversion unit in accordance with the mutual inductance acquired on the basis of the detection value of a current is provided, even when an interval (gap) between the power transmission side coil and the power reception side coil changes, appropriate power control and abnormality detection can be performed.

In the case of the foregoing aspect (2), change in the mutual inductance can be accurately detected by acquiring the mutual inductance in a fully-open output state in which an output is not restricted.

In the case of the foregoing aspect (3), when the mutual inductance becomes smaller than the predetermined threshold due to a moving object such as a vehicle which is equipped with the power reception unit and has left a section of power transmission, occurrence of an abnormality, or the like, appropriate control can be performed by restricting an output of the power conversion unit.

In the case of the foregoing aspect (4), power received by the power reception unit can be restricted by short-circuiting the power reception side coil, and a current in the power transmission device can be reduced. Therefore, independent power control can be performed by the power reception unit and a power control unit.

BRIEF DESCRIPTION OF THE DRAWINGS

FIG. 5 is a graph diagram showing an example of a correspondence between a distance and a mutual inductance between coils on a power transmission side and a power reception side (a distance in a direction orthogonal to an

DETAILED DESCRIPTION OF THE INVENTION

Hereinafter, a non-contact power transmission system according to an embodiment of the present invention will be described with reference to the accompanying drawings.

Figure 1:
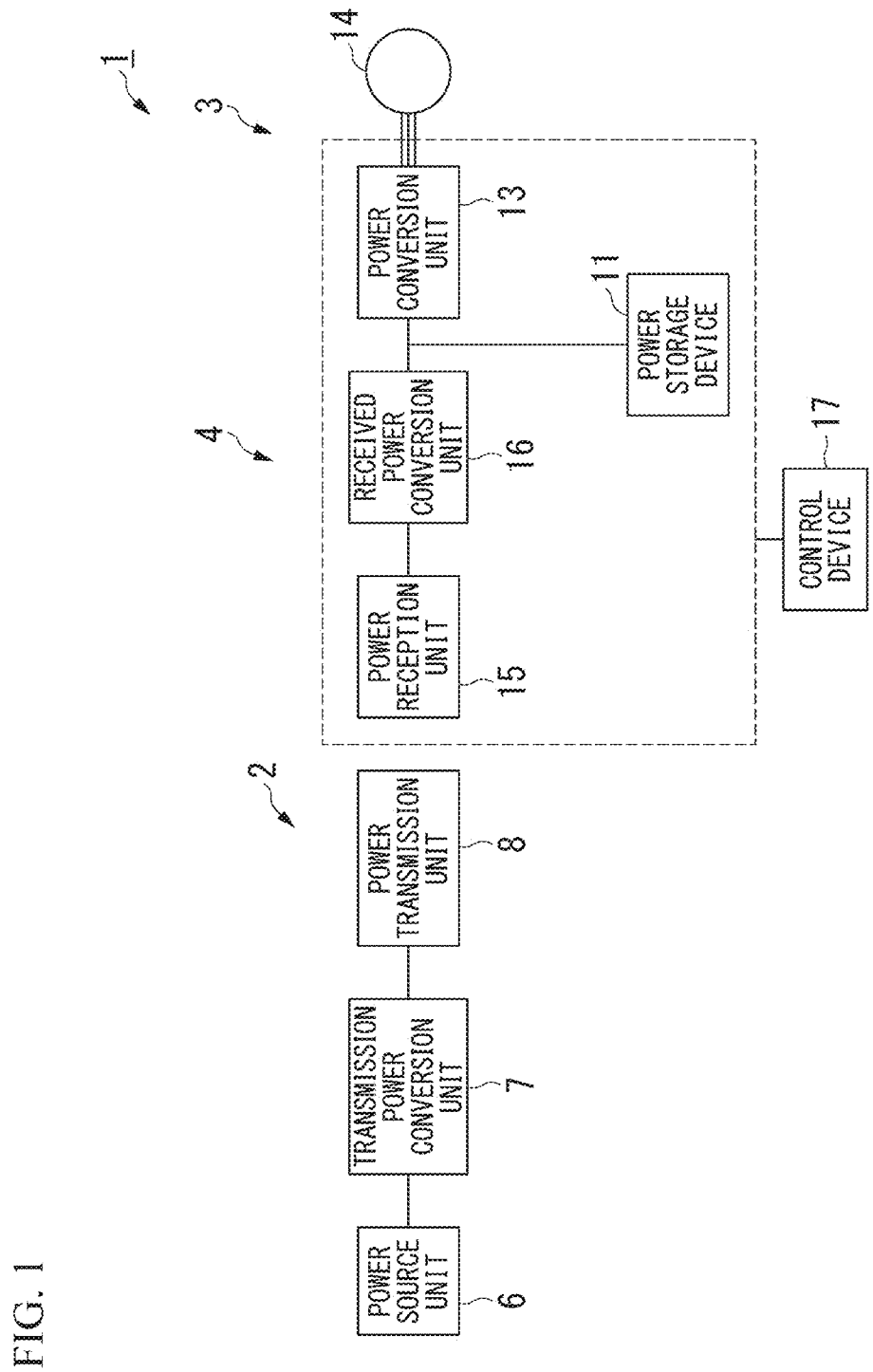
FIG. 1 is a view showing a constitution of a non-contact power transmission system according to an embodiment of the present invention.
Figure 2:
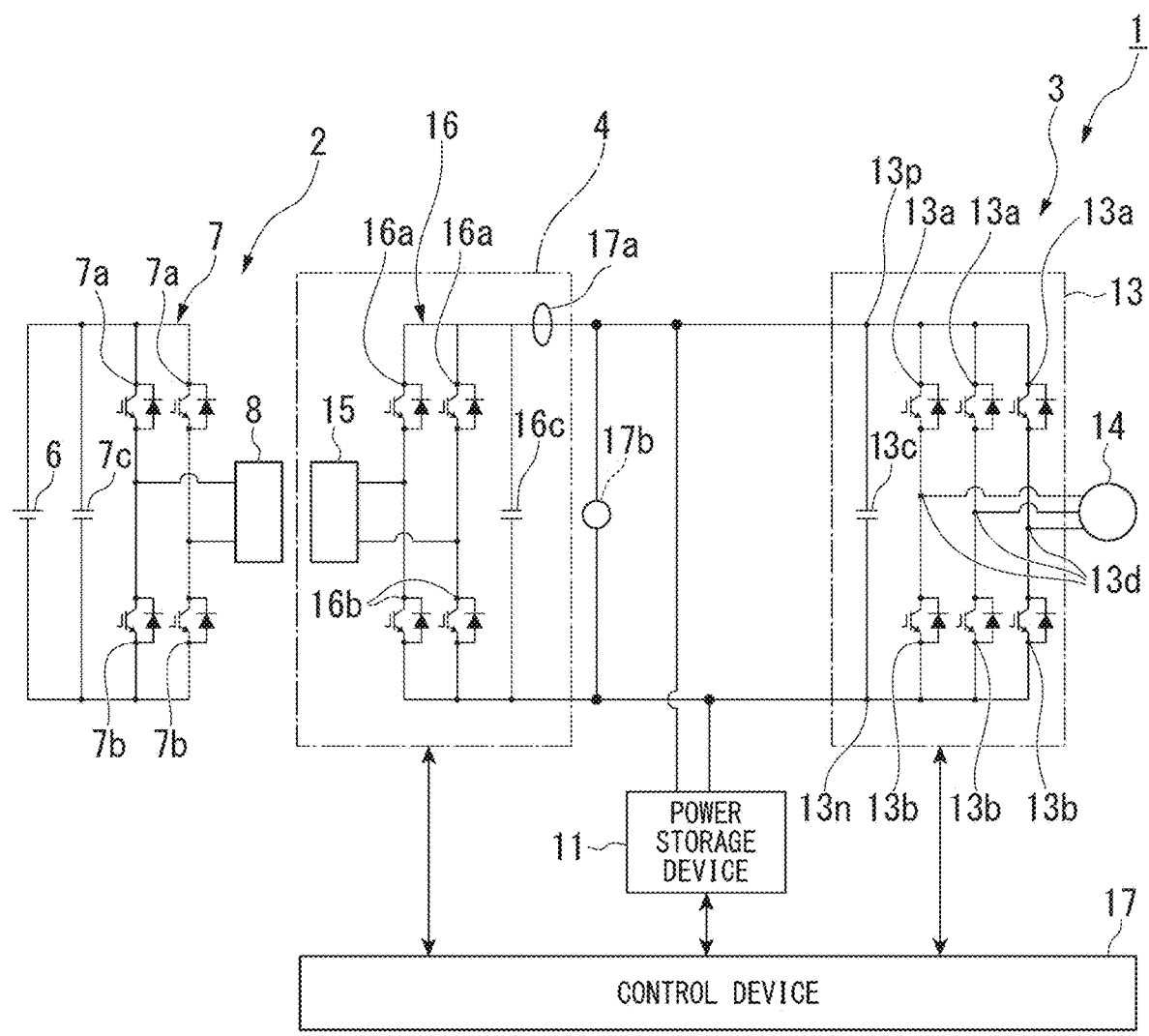
FIG. 2 is a view showing a detailed constitution of the non-contact power transmission system according to the embodiment of the present invention.
Figure 3:
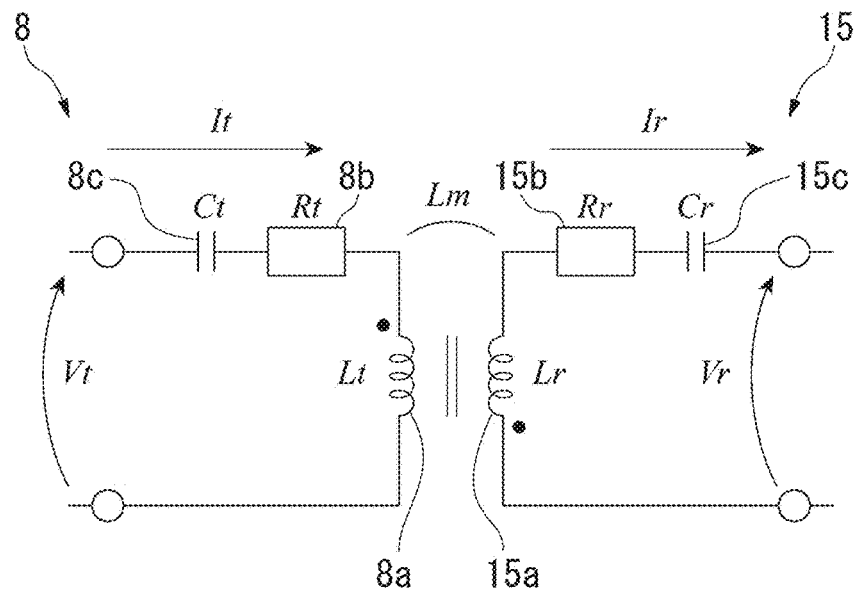
FIG. 3 is a view showing constitutions of a power transmission unit and a power reception unit of the non-contact power transmission system according to the embodiment of the present invention.

FIGS. 1 and 2 are views showing constitutions of a non-contact power transmission system 1 according to the embodiment. FIG. 3 is a view showing constitutions of a power transmission unit 8 and a power reception unit 15 of the non-contact power transmission system 1 according to the embodiment.

For example, the non-contact power transmission system 1 according to the embodiment supplies power to a moving object such as a vehicle from outside the moving object through non-contact power transmission. For example, the vehicle is an electrically-driven vehicle such as an electric vehicle, a hybrid vehicle, or a fuel cell vehicle.

(Non-Contact Power Transmission System)

As shown in FIGS. 1 and 2, for example, the non-contact power transmission system 1 according to the embodiment includes power transmission devices 2 installed on a traveling road or the like of a vehicle, and a drive control device 3 and a power reception device 4 mounted in a moving object such as a vehicle. The non-contact power transmission system 1 according to the embodiment may simply include at least constituent elements (for example, the drive control device 3 and the power reception device 4) mounted in a moving object, or non-contact power transmission may be executed by a combination of constituent elements outside a moving object (for example, the power transmission device 2) and the non-contact power transmission system 1 mounted in the moving object.

For example, the power transmission device 2 includes a power source unit 6, a transmission power conversion unit 7, and the power transmission unit 8. For example, the power transmission device 2 may include at least a plurality of power transmission units 8 in a predetermined power transmission section on a traveling road or the like of a vehicle.

For example, the power source unit 6 includes an AC power source such as a commercially available power source, an AC-DC converter converting AC power into DC power, and a power smoothing capacitor. The power source unit 6 converts AC power supplied from the AC power source into DC power through the AC-DC converter.

For example, the transmission power conversion unit 7 includes an inverter converting DC power into AC power. For example, the inverter of the transmission power conversion unit 7 includes a bridge circuit formed using a plurality of switching elements and rectification elements that are bridge-connected in two phases, and a voltage smoothing capacitor. For example, each of the switching elements is a transistor such as a silicon carbide (SiC) metal oxide semi-conductor field effect transistor (MOSFET). The plurality of switching elements are transistors $7a$ and $7b$ of a high side arm and a low side arm forming a pair in each phase. For example, the rectification elements are reflux diodes connected to the respective transistors $7a$ and $7b$ in parallel. A voltage smoothing capacitor $7c$ is connected to the bridge circuit in parallel.

For example, the power transmission unit 8 sends power due to change in high-frequency magnetic field through magnetic field coupling such as magnetic field resonance or electromagnetic induction. As shown in FIG. 3, for example, the power transmission unit 8 includes a resonance circuit formed using a primary side coil $8a$, a primary side resistance $8b$, and a primary side capacitor $8c$ that are connected in series. For example, the power transmission unit 8 includes a sensor such as a current sensor for detecting a current It flowing in the resonance circuit.

For example, the power transmission device 2 performs power transmission to the power reception device 4 of a moving object such as a vehicle by controlling ON (conductive) and OFF (cut-off) of each of the switching elements of the transmission power conversion unit 7 in accordance with information of a drive frequency set in advance or a required frequency received from the power reception device 4.

As shown in FIGS. 1 and 2, for example, the drive control device 3 of a moving object such as a vehicle includes a power storage device 11, a power conversion unit 13, and a rotary electric machine 14. For example, the power reception device 4 of a moving object includes the power reception unit 15 and a received power conversion unit 16. For example, the drive control device 3 and the power reception device 4 include a common control device 17.

The power storage device 11 is connected to the power conversion unit 13 and the received power conversion unit 16 (which will be described below). The power storage device 11 is charged by means of power transmitted from the power transmission device 2 outside the vehicle in a non-contact manner. The power storage device 11 transfers power with respect to the rotary electric machine 14 via the power conversion unit 13.

For example, the power storage device 11 includes a battery such as a lithium-ion battery, a current sensor for detecting a battery current, and a voltage sensor for detecting a battery voltage.

The power conversion unit 13 is connected to the rotary electric machine 14. For example, the power conversion unit 13 includes a power converter performing conversion between DC power and AC power. For example, the power converter includes a second element module and a voltage smoothing capacitor.

For example, the second element module includes a second bridge circuit formed using a plurality of switching elements and rectification elements that are bridge-connected in three phases. For example, each of the switching elements is a transistor such as a SiC MOSFET. The plurality of switching elements are transistors $13a$ and $13b$ of the high side arm and the low side arm forming a pair in each phase. For example, the rectification elements are reflux diodes connected to the respective transistors $13a$ and $13b$ in parallel. A voltage smoothing capacitor $13c$ is connected to the second bridge circuit in parallel.

The second element module controls operation of the rotary electric machine 14 through transfer of power. For example, during power running of the rotary electric machine 14, the second element module converts DC power input from positive and negative DC terminals $13p$ and $13n$ into three-phase AC power and supplies three-phase AC power from a three-phase AC terminal $13d$ to the rotary electric machine 14. The second element module generates a rotational drive force by sequentially commutating electrification to a three-phase stator winding wire of the rotary electric machine 14.

For example, at the time of regeneration of the rotary electric machine 14, the second element module converts three-phase AC power input through the three-phase stator winding wire into DC power by driving between ON (conductive) and OFF (cut-off) of the switching elements of each phase synchronized with rotation of the rotary electric machine 14. The second element module can supply DC power converted from three-phase AC power to the power storage device 11.

For example, the rotary electric machine 14 is a three-phase AC brushless DC motor provided for traveling driving of the vehicle. The rotary electric machine 14 includes a rotor having a permanent magnet for a magnetic field, and a stator having a three-phase stator winding wire for generating a rotating magnetic field rotating the rotor. The three-phase stator winding wire is connected to the three-phase AC terminal 13*d* of the power conversion unit 13.

The rotary electric machine 14 generates a rotational drive force by performing a power running operation using power supplied from the power conversion unit 13. For example, the rotary electric machine 14 generates a traveling drive force by performing a power running operation using power supplied from the power conversion unit 13 when it can be coupled to wheels of the vehicle. The rotary electric machine 14 may generate generated power by performing a regenerative operation using rotational power input from the wheel side of the vehicle. The rotary electric machine 14 may generate power using motive power of an internal-combustion engine of the vehicle when it can be coupled to the internal-combustion engine.

The power reception unit 15 is connected to the received power conversion unit 16. For example, the power reception unit 15 receives power due to change in high-frequency magnetic field transmitted from the power transmission units 8 through magnetic field coupling such as magnetic field resonance or electromagnetic induction. As shown in FIG. 3, for example, the power reception unit 15 includes a resonance circuit formed using a secondary side coil 15*a*, a secondary side resistance 15*b*, and a secondary side capacitor 15*c* that are connected in series. For example, the power reception unit 15 includes a sensor such as a current sensor for detecting a current Ir flowing in the resonance circuit.

The received power conversion unit 16 shown in FIGS. 1 and 2 is connected to the power conversion unit 13. The received power conversion unit 16 includes a so-called full bridgeless-type (or a bridgeless-type or a totem pole-type) power factor correction (PFC) circuit that converts AC power into DC power. A so-called bridgeless PFC is a PFC including no bridge rectifier constituted of a plurality of bridge-connected diodes, and a so-called totem pole PFC is a PFC including a pair of switching elements of the same conductivity type connected in series (totem pole connected) in the same direction.

For example, the received power conversion unit 16 includes a third bridge circuit formed using a plurality of switching elements and rectification elements that are bridge-connected in two phases, and a voltage smoothing capacitor. For example, each of the switching elements is a transistor such as a SiC MOSFET. The plurality of switching elements are transistors 16*a* and 16*b* of the high side arm and the low side arm forming a pair in each phase. For example, the rectification elements are reflux diodes connected to the respective transistors 16*a* and 16*b* in parallel. A voltage smoothing capacitor 16*c* is connected to the third bridge circuit in parallel.

For example, the power reception device 4 including the power reception unit 15 and the received power conversion unit 16 receives power transmitted from the power transmission device 2 by controlling ON (conductive) and OFF (cut-off) of each of the switching elements of the received power conversion unit 16 in accordance with information of the frequency of power transmission of the power transmission device 2.

For example, the control device 17 controls the drive control device 3 and the power reception device 4 of a moving object such as a vehicle in an integrated manner. For example, the control device 17 is a software functional unit functioning when a processor such as a central processing unit (CPU) executes a predetermined program. The software functional unit is an ECU including a processor such as a CPU, a read only memory (ROM) storing a program, a random access memory (RAM) transitorily storing data, and an electronic circuit such as a timer. At least a part of the control device 17 may be an integrated circuit such as a large scale integration (LSI).

For example, the control device 17 generates a control signal indicating a timing of driving each of the switching elements between ON (conductive) and OFF (cut-off) and generates a gate signal for actually driving ON and OFF of each of the switching elements on the basis of a control signal.

For example, the control device 17 performs power factor correction of an input voltage and an input current while rectifying AC power received from the power transmission device 2 into DC power by controlling switching of each of the switching elements of the power reception device 4.

For example, the control device 17 controls switching operations of the plurality of switching elements of the received power conversion unit 16 on the basis of a detection value of a current output from a current sensor 17*a* for detecting a current output from the received power conversion unit 16 and a detection value a voltage output from a voltage sensor 17*b* for detecting a voltage output from the received power conversion unit 16.

For example, the control device 17 controls an output corresponding to a target output through a synchronous rectification operation of synchronously driving ON and OFF of the plurality of switching elements of the power reception device 4 and a short circuit operation of short-circuiting the secondary side coil 15*a*.

For example, the control device 17 controls the synchronous rectification operation in accordance with the magnitude and the phase of a current generated in the power reception unit 15 by means of power sent from the power transmission device 2, namely, the current Ir flowing in the secondary side coil 15*a*. The control device 17 controls the plurality of switching elements of the received power conversion unit 16 through soft switching of so-called zero voltage switching (ZVS). In zero voltage switching (ZVS), voltages at both ends of each of the switching elements are set to zero and then turning-on (switching from an OFF state to an ON state) is executed through discharging of an output capacitance (parasitic capacitance) in the OFF state during a dead time period of each phase.

For example, the control device 17 controls the short circuit operation by turning on only the low side arm of each phase while continuing the synchronous rectification operation of zero voltage switching (ZVS) in the high side arm of each phase of the received power conversion unit 16. The control device 17 increases the secondary side impedance when the secondary side power reception device 4 is viewed from the primary side power transmission device 2 and reduces the primary side current (power transmission current: the current It flowing in the primary side coil 8*a*) by short-circuiting the secondary side coil 15*a*. The control device 17 executes independent power control such as halting power transmission on the power reception device 4 side by controlling a current of the primary side power transmission device 2 using the secondary side power reception device 4.

For example, the control device 17 acquires a mutual inductance Lm between the primary side coil 8a and the secondary side coil 15a on the basis of the respective detection values output from the current sensor 17a and the voltage sensor 17b and controls the received power conversion unit 16 in accordance with the mutual inductance Lm.

Figure 4:
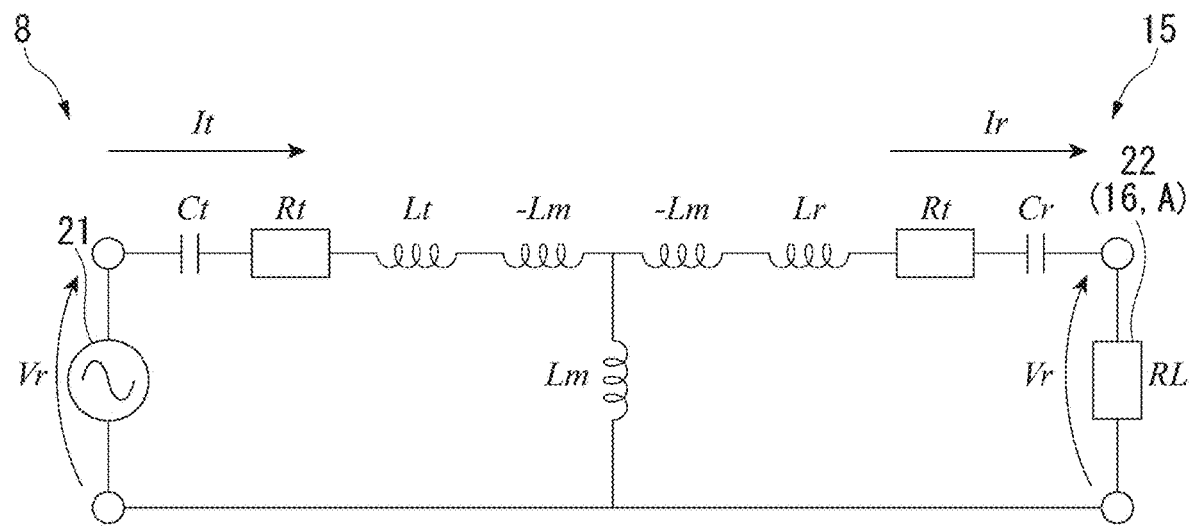
FIG. 4 is a view showing a T-type equivalent circuit in the non-contact power transmission system according to the embodiment of the present invention.

FIG. 4 is a view showing a T-type equivalent circuit in the non-contact power transmission system 1 according to the embodiment.

As shown in FIG. 4, for example, the T-type equivalent circuit of the non-contact power transmission system 1 is accounted for by a voltage Vt of an AC voltage source 21; a capacitance Ct, an internal resistance value Rt, a self-inductance Lt, and the current It of the power transmission unit 8; the mutual inductance Lm; a capacitance Cr, an internal resistance value Rr, a self-inductance Lr, and the current Ir of the power reception unit 15; and a voltage Vr and a load resistance value RL of a load resistance 22.

For example, the load resistance 22 corresponds to the received power conversion unit 16 and a load resistance A connected between DC terminals (positive and negative) of the received power conversion unit 16. For example, the load resistance A is the drive control device 3 or the like.

As in the voltage equation shown in the following mathematical expression (1), the current It of the power transmission unit 8 and the current Ir and the voltage Vr of the power reception unit 15 are accounted for by a frequency $\omega_0$ of power transmission, the mutual inductance Lm, each of the resistance values Rt, Rr, and RL, and the voltage Vt of the power transmission unit 8.

$$\left. \begin{array}{l} It = \dfrac{Rr + RL}{(\omega_0 Lm)^2 + Rt(Rr + RL)} Vt \\ Ir = -\dfrac{\omega_0 Lm}{(\omega_0 Lm)^2 + Rt(Rr + RL)} Vt \\ Vr = \dfrac{\omega_0 \cdot Lm \cdot RL}{(\omega_0 Lm)^2 + Rt(Rr + RL)} Vt \end{array} \right\} \quad (1)$$

As shown in the following mathematical expression (2), for example, on the assumption that power transmission is in an efficient state, when the voltage Vt of the power transmission unit 8 and the voltage Vr of the power reception unit 15 are set to be the same, on the basis of the foregoing mathematical expression (1), the load resistance value RL is accounted for by the frequency $\omega_0$ of power transmission, the mutual inductance Lm, and each of the internal resistance values Rt and Rr.

$$\left. \begin{array}{l} Vr = Vt \\ \omega_0 \cdot Lm \cdot RL = (\omega_0 Lm)^2 + Rt(Rr + RL) \\ RL = \dfrac{(\omega_0 Lm)^2 + Rt \cdot Rr}{\omega_0 Lm - Rt} \end{array} \right\} \quad (2)$$

In the load resistance 22, since the received power conversion unit 16 operates such that the voltage Vr is converted (stepped down) into a voltage V1 of the load resistance A, a load resistance value RL' of the load resistance A viewed from the transmission side when waveforms of the current Ir are averaged is accounted for on the basis of the voltage V1 and a current Irdc of the load resistance A as shown in the following mathematical expression (3). For example, the current Irdc of the load resistance A is detected by the current sensor 17a, and the voltage V1 of the load resistance A is detected by the voltage sensor 17b.

$$RL' = \dfrac{V1}{Irdc} = k\left(\dfrac{(\omega_0 Lm)^2 + Rt \cdot Rr}{\omega_0 Lm - Rt} + Rt\right) \quad (3)$$

As shown in the foregoing mathematical expression (3), for example, the load resistance value RL' is accounted for by a predetermined coefficient k (for example, $k=\pi^2/8$), the frequency $\omega_0$ of power transmission, the mutual inductance Lm, and each of the internal resistance values Rt and Rr on the basis of the voltage V1 and the current Irdc of the load resistance A.

For example, the predetermined coefficient k (for example, $k=\pi^2/8$) is set on the basis of a situation in which an averaged current is output from the received power conversion unit 16 when the voltage V1 is clamped (fixed) due to connection of the power storage device 11 and the waveform of the current Ir exhibits a sinusoidal wave shape. For example, the predetermined coefficient k is a coefficient or the like corresponding to a smoothing ratio when currents are averaged. For example, the predetermined coefficient k may be suitably changed in accordance with a current waveform other than a sinusoidal wave shape corresponds to individual instruments or the like.

For example, the control device 17 acquires the mutual inductance Lm on the basis of each of the detection values output from the current sensor 17a and the voltage sensor 17b, and the foregoing mathematical expression (3) in a fully-open output section other than a section in which an output of the received power conversion unit 16 is restricted through the short circuit operation of short-circuiting the secondary side coil 15a in a predetermined power transmission section. The control device 17 controls power transmission by ascertaining the relative positional relationship between the power transmission unit 8 and the power reception unit 15 in accordance with the mutual inductance Lm.

Figure 5:
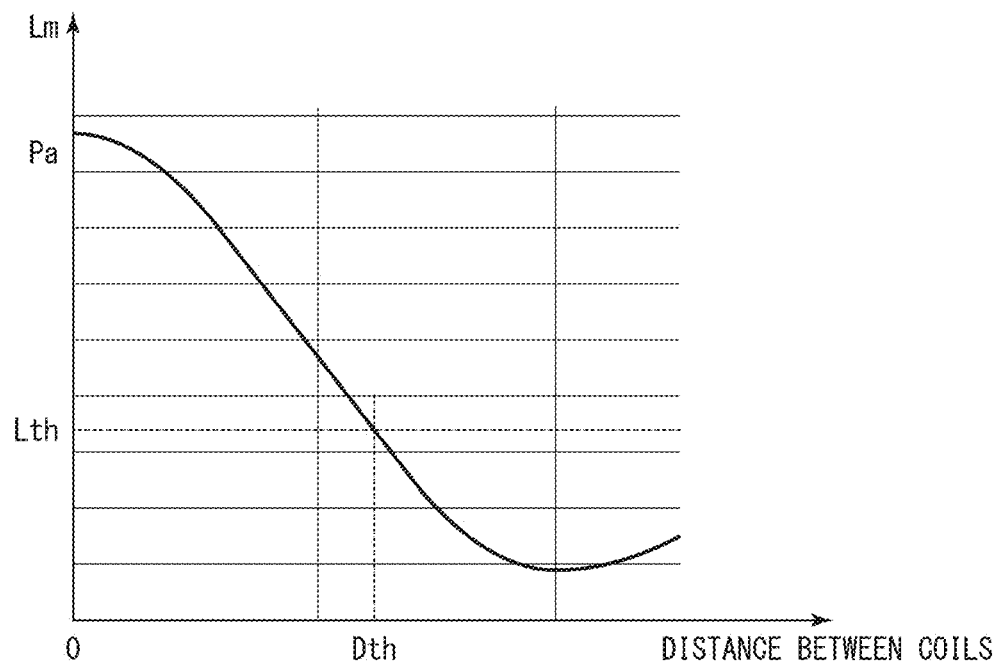

FIG. 5 is a graph diagram showing an example of a correspondence between a distance and the mutual inductance Lm between coils on a power transmission side and a power reception side (a distance in a direction orthogonal to an opposing direction) in the non-contact power transmission system 1 according to the embodiment.

As shown in FIG. 5, for example, in a range in which the coil distance between the primary side coil 8a and the secondary side coil 15a is zero to a predetermined threshold distance Dth, the control device 17 executes full-wave rectification through fully-open outputting in which the output is not restricted by the synchronous rectification operation or the like of the received power conversion unit 16. For example, the predetermined threshold distance Dth stipulates a range which corresponds to a predetermined threshold Lth of the mutual inductance Lm and in which efficiency of power transmission becomes 85% or higher.

For example, when the mutual inductance Lm is smaller than the predetermined threshold Lth as the distance between the coils becomes larger than the predetermined threshold distance Dth, the control device 17 halts the full-wave rectification through fully-open outputting of the received power conversion unit 16. For example, the control device 17 shifts the power reception device 4 to a standby state through the short circuit operation of the received power conversion unit 16 and controls the current of the primary side power transmission device 2 by reducing the output, halting power transmission, or the like.

In addition, for example, when damage such as cracking or chipping occurs due to vibration of the vehicle body or the like in a core member made of a magnetic material provided together with the secondary side coil 15a of the power reception unit 15, the control device 17 detects occurrence of an abnormality as the mutual inductance Lm becomes smaller than the predetermined threshold Lth.

As described above, according to the non-contact power transmission system 1 of the embodiment, even when the interval (gap) between the primary side coil 8a and the secondary side coil 15a changes, appropriate power control and abnormality detection can be performed by controlling the received power conversion unit 16 in accordance with the mutual inductance Lm acquired on the basis of the detection value of a current output from the received power conversion unit 16.

Change in the mutual inductance Lm can be accurately detected by acquiring the mutual inductance Lm in a fully-open output state in which an output is not restricted.

When the mutual inductance Lm becomes smaller than the predetermined threshold Lth due to a moving object such as a vehicle which is equipped with the power reception device 4 and has left a section of power transmission, occurrence of an abnormality, or the like, appropriate control can be performed by restricting an output of the received power conversion unit 16.

Power received by the power reception unit 15 can be restricted by short-circuiting the secondary side coil 15a, and a current in the power transmission device 2 can be reduced. Therefore, independent power control can be performed by the secondary side power reception device 4.

Modification Example

According to the embodiment described above, the non-contact power transmission system 1 includes the voltage sensor 17b for detecting a voltage output from the received power conversion unit 16, but the embodiment is not limited to this. For example, other voltage sensors for detecting voltages in various instruments of the drive control device 3 on the power reception side may be provided, and a voltage output from the received power conversion unit 16 may be acquired from outputs of other voltage sensors.

According to the embodiment described above, for example, in the case of a hybrid vehicle or the like that is driven by the power storage device 11 and an internal-combustion engine as motive power sources, the non-contact power transmission system 1 may include a storage voltage conversion unit converting input/output power of the power storage device 11.

The embodiment of the present invention is presented as an example and is not intended to limit the scope of the invention. The embodiment can be performed in various other forms, and various omissions, replacements, and changes can be made within a range not departing from the gist of the invention. The embodiment and modifications thereof are included in the invention described in the claims and the scope equivalent thereto as they are included in the scope and the gist of the invention.

What is claimed is:

1. A non-contact power transmission system comprising:
   a power reception unit that has a power reception side coil receiving AC power transmitted from a power transmission side coil of a power transmission device in a non-contact manner;
   a power conversion unit that converts the AC power received by the power reception unit into DC power;
   a current sensor that detects a current output from the power conversion unit; and
   a control device that acquires a mutual inductance between the power transmission side coil and the power reception side coil on the basis of a detection value of the current output from the current sensor and controls the power conversion unit in accordance with the mutual inductance, wherein, when the mutual inductance is smaller than a predetermined threshold, the control device restricts an output of the power conversion unit through a short circuit operation of short-circuiting the power reception side coil.

2. The non-contact power transmission system according to claim 1, wherein the control device acquires the mutual inductance on the basis of the detection value of the current output from the current sensor in a state in which the output of the power conversion unit is not restricted.

* * * * *